PULSE STRETCHERS

Filed June 23, 1951 4 Sheets-Sheet 1

INVENTORS
CHARLES F. WEST
BRUCE K. SMITH
FRANKLIN R. DEAN
BY Elmer J. Gorn
ATTORNEY INVENTORS
CHARLES F. WEST
BRUCE K. SMITH
FRANKLIN R. DEAN
BY Elmer J. Gorn
ATTORNEY

PULSE STRETCHERS

Filed June 23, 1951 4 Sheets-Sheet 3

INVENTORS
CHARLES F. WEST
BRUCE K. SMITH
FRANKLIN R. DEAN
BY Elmer J. Gorn
ATTORNEY INVENTORS
CHARLES F. WEST
BRUCE K. SMITH
FRANKLIN R. DEAN
BY [signature]
ATTORNEY

United States Patent Office 2,802,101
Patented Aug. 6, 1957

2,802,101

PULSE STRETCHERS

Charles F. West, Sunol, Calif., Bruce K. Smith, Melbourne, Fla., and Franklin R. Dean, Boston, Mass., assignors to Raytheon Manufacturing Company, Newton, Mass., a corporation of Delaware Application June 23, 1951, Serial No. 233,188

19 Claims. (Cl. 250—27)

Figure 1:
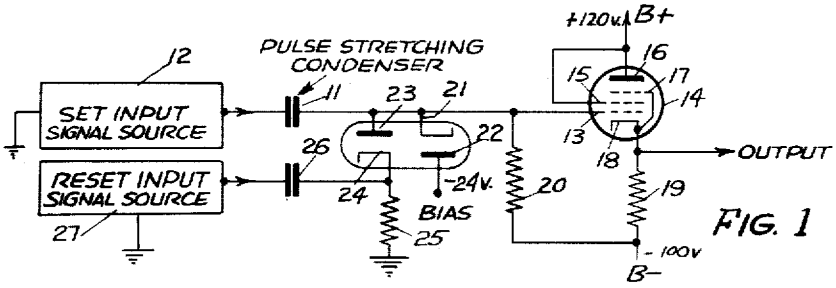

This invention relates to wave form generating devices, and more particularly to wave form generating devices employing pulse stretching circuits.

There are in existence many well-known wave form generating circuits which may be used for generating gating pulses. However, in applications involving computers, a gating circuit is required wherein the length of the gating pulse, or duration of the open condition of the gate, must be accurately instituted and terminated by means of control signals. Among the circuits available for this purpose are the so-called flip-flop or bistable mutivibrator, and the dynamic flip-flop or one pulse multivibrator used in conjunction with a circulating delay line. These circuits employ D. C. coupling, and are very unstable in operation, since the circuit components involved are critical.

This invention discloses a wave form generator utilizing a pulse stretching technique wherein a condenser is charged from a signal source through a unidirectional conductor such as a diode or a crystal. The charge then remains on the condenser for a substantial period of time or until discharged by a control signal through another unidirectional conductor. The charge on the condenser may be fed to the output load through a cathode follower. Substantially no load is placed on the condenser by the cathode follower, and the output of the cathode follower may be used to feed a low impedance load. Such a circuit has the additional advantage of being adapted for use in devices requiring extremely rapid switching times. It is possible, for example, to obtain switching times from gate off to gate on of less than one tenth microsecond. Since the circuits are not critical in operation, changes in circuit parameters, for example, due to aging or to variation in supply voltage, do not affect the operation of the circuit.

This invention discloses particular circuits, one species of which will operate on positive initiating pulses and negative terminating pulses, and another species of which will operate on negative initiating and terminating pulses.

This invention further discloses that the pulse stretcher may be made regenerative by using the output of the cathode follower to open a gate which feeds periodic initiating pulses to the input of the pulse stretcher. By so doing, the charge on the condenser which has a tendency to leak off, due to resistive circuit paths across the condenser, is periodically replenished such that the gate remains open until the terminating or reset pulse shuts off the gate.

This invention discloses three species of regenerative pulse stretchers. In one species, the regenerative pulses are fed through a gate as positive pulses, and are inverted by a phase inverting amplifier and applied to the charge storing condenser of a pulse stretcher which utilizes negative initiating pulses.

In another species of the regenerative pulse stretcher disclosed herein, a gate is actuated by the output of the pulse stretcher to pass positive regenerative pulses. The pulses are then amplified by a transformer coupled amplifier which feeds positive regenerative pulses to a pulse stretcher adapted to be initiated by positive pulses.

In still another species of the regenerative pulse stretcher disclosed herein, a gate is adapted to pass positive regenerative pulses. These pulses are then increased in amplitude by means of a voltage doubler following which they are fed to a charge storage condenser through a unidirectional conductor. The charge on the condenser, in turn, is fed to the input of a cathode follower amplifier, the output of which is used to open said gate.

Figures 2A, 2B, 2C:
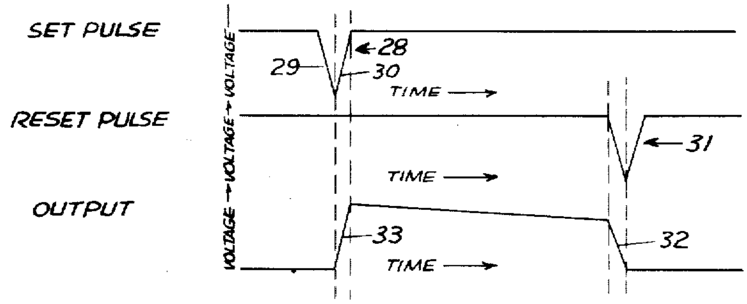
Figure 3:
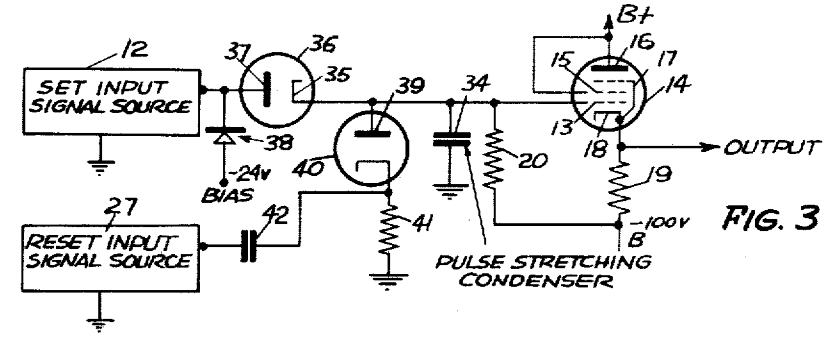
Figures 4A, 4B, 4C:
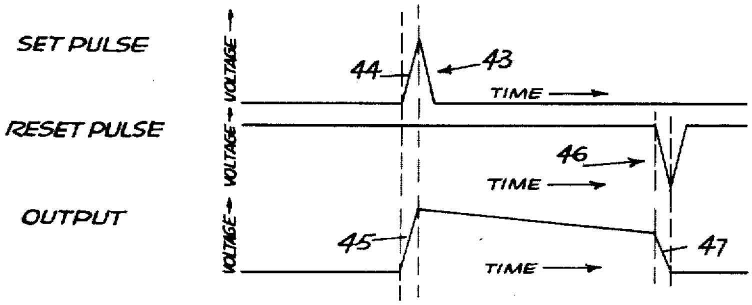
Figure 5:
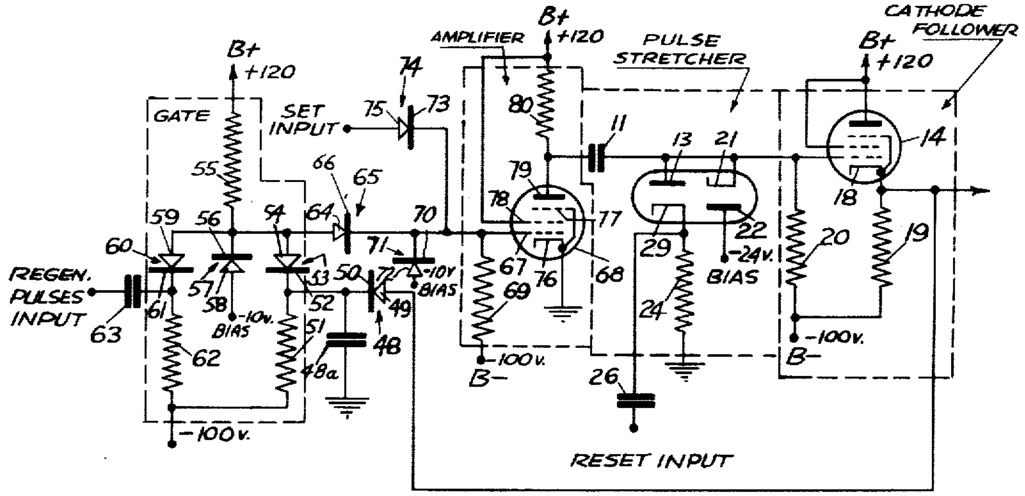
Figure 7:
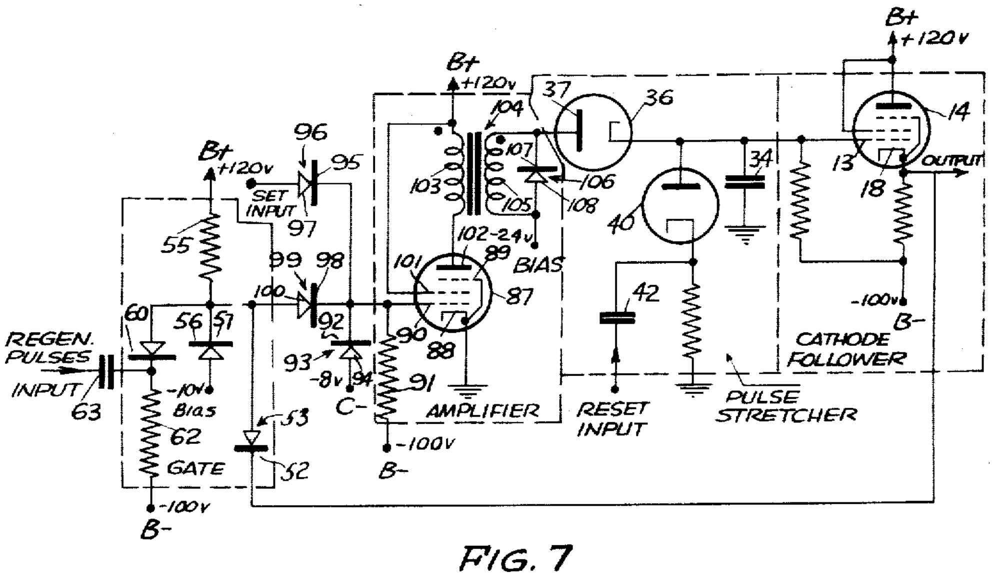
Figure 9:
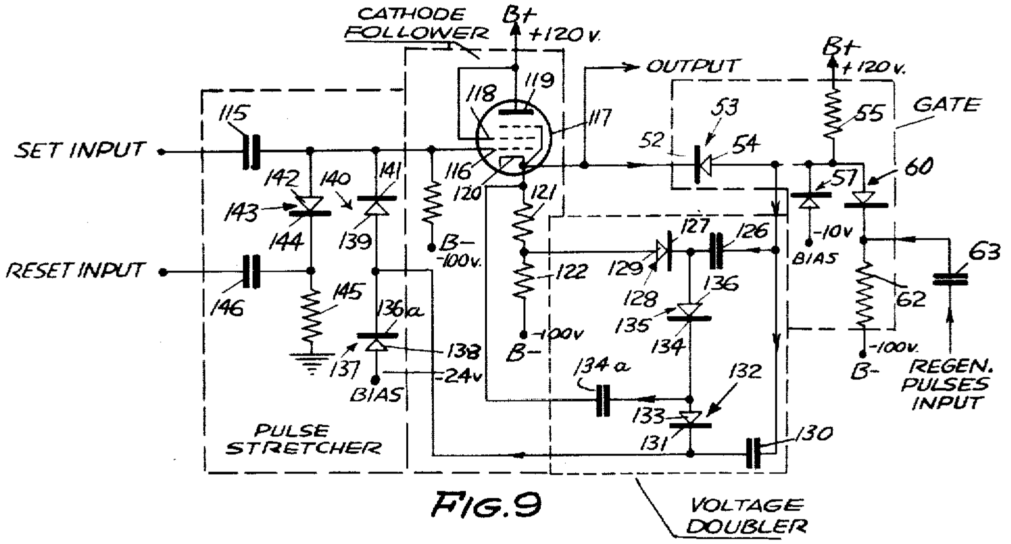

Other and further object and advantages of this invention will become apparent as the description thereof progresses, reference being had to the accompanying drawings, wherein:

Fig. 1 illustrates a circuit diagram of a pulse stretcher adapted to be set by negative initiating pulses and negative terminating pulses, and having a positive gate pulse output;

Figs. 2*a*, 2*b* and 2*c* illustrate, respectively, the wave forms of the set or initiating pulse, the reset or terminating pulse and the output wave form of the pulse stretcher illustrated in Fig. 1;

Fig. 3 illustrates a circuit diagram of a pulse stretcher adapted to be set by positive initiating pulses, reset by negative terminating pulses, and having a positive output gate pulse;

Figs. 4*a*, 4*b* and 4*c* illustrate wave forms of the set pulse, reset pulse and and output wave form, respectively, of the pulse stretcher illustrated in Fig. 3;

Fig. 5 illustrates a circuit diagram of a regenerative pulse stretcher adapted to be set by positive initiating pulses, and reset by negative terminating pulses, and continuously regenerated by positive regeneration pulses, the pulse stretcher proper being fed by a phase inverting amplifier, whereby the set pulses and regeneration pulses are applied to the pulse stretcher as negative pulses;

Figs. 6*a*, 6*b*, 6*c* and 6*d* illustrate wave forms of the set pulse, the reset pulse, regeneration pulses and the output wave form, respectively, of the regenerative pulse stretcher illustrated in Fig. 5;

Fig. 7 illustrates a circuit diagram of a regenerative pulse stretcher utilizing positive regenerative and set pulses, said pulses being applied to the pulse stretcher proper as positive pulses;

Figs. 8*a*, 8*b*, 8*c* and 8*d* illustrate wave forms of the set pulse, reset pulse, regeneration pulses and output wave form of the regenerative pulse stretcher illustrated in Fig. 7;

Fig. 9 illustrates a circuit diagram of a regenerative pulse stretcher utilizing a negative set pulse and positive regeneration pulses and a voltage doubler for increasing the amplitude of the regeneration pulses; and Figs. 10*a*, 10*b*, 10*c* and 10*d* illustrate wave forms of the set pulse, reset pulse, regeneration pulses and output wave form, respectively, of the regenerative pulse stretcher illustrated in Fig. 9.

Referring now to Fig. 1, there is shown a pulse stretcher comprising a charge storage condenser 11, one side of which is connected to a set input signal source 12, the other side of said input source 12 being connected to ground. The other side of the condenser 11 is connected to the grid 13 of a cathode follower amplifier 14. The screen grid 15 and plate 16 of amplifier 14 are connected to a positive voltage of, for example, 120 volts, while the suppressor grid 17 and cathode 18 of amplifier 14 are connected through a cathode load resistor 19 to a negative voltage source of, for example, minus 100 volts. Grid 13 is connected through a grid load resistor 20 to said negative voltage source, and to the cathode 21 of a diode whose plate 22 is connected to a negative bias voltage source of, for example, minus twenty-four volts. Grid 13 is also connected to the plate 23 of another diode whose cathode 24 is connected to ground through a load resistor 25 and through a condenser 26 to a reset input signal source 27, the other side of source 27 being grounded.

Referring now to Figs. 2*a*, 2*b* and 2*c*, there will be described the operation of the device shown in Fig. 1.

When it is desired to generate a gate output wave form, a negative triangular pulse, as shown at 28, in Fig. 2*a*, is applied to condenser 11 from the set input signal source 12. The leading edge 29 of wave form 28 attempts to drive diode cathode 21 more negative than its respective diode plate 22 causing current to flow from cathode 21 to plate 22, thereby charging condenser 11. When the leading edge 29 of the wave form has passed, and the trailing edge 30 is applied to the condenser 11, it raises the potential of condenser 11, cutting off the current between diode cathode 21 and diode plate 22, and moving grid 13 in a positive direction by a voltage substantially equal to the amplitude of the pulse 28. Cathode 18 of cathode follower 14 follows the grid 13 in a positive direction by a similar amount, thereby producing a positive excursion of the output wave form, as shown at 33 in Fig. 2*c*. Condenser 11 discharges very slowly through resistor 20, thus enabling the production of a positive output voltage at cathode 18 for a considerable length of time.

When it is desired to terminate the positive output voltage of cathode 18, a negative triangular pulse, as indicated at 31, in Fig. 2*b*, is applied from reset input signal source 27 through condenser 26 to the cathode 24 of the diode whose plate is connected to grid 13. This causes current to flow from diode cathode 24 to diode plate 23 discharging condenser 11 and driving grid 13 negative, thereby driving cathode 18 in a negative directhereby producing a positive excursion of the output wave form, as shown at 32.

In the absence of any signals, grid 13 is maintained substantially at bias voltage applied to plate 22, since a small amount of current is drawn through resistor 20 from the negative voltage source to the cathode 21, thus producing a grid clamping action in the absence of circuit activity.

Referring now to Fig. 3, there is shown another species of pulse stretcher operated from a set input signal source 12, and a reset input signal source 27, and driving a cathode follower 14 having a grid 13, cathode 18, output load resistor 19, grid load resistor 20, screen grid 15, plate 16 and suppressor grid 17 all similar to those shown in Fig. 1.

A charge storage condenser 34 is connected between grid 13 and ground. Grid 13 is also connected to the cathode 35 of a diode 36 whose plate 37 is connected to set input signal source 12. Plate 37 is also connected through a crystal diode 38 to a bias source of, for example, minus twenty-four volts, the polarity of crystal diode 38 being such that electrons will flow from plate 37 to the bias source. Grid 13 is also connected to the plate 39 of a second diode 40 whose cathode is connected to ground through a load resistor 41 and to the reset input signal source 27 through a condenser 42.

Referring now to Figs. 4*a*, 4*b* and 4*c*, the operation of the device shown in Fig. 3 will be described.

In the absence of circuit activity, grid 13 is maintained at substantally the potential of the bias source, due to current being drawn through resistor 20, diode 36 and clamping crystal 38 to said bias source.

When it is desired to initiate an output wave form, a positive set pulse, as illustrated at 43, in Fig. 4*a*, is applied from the set input signal source to diode 36, thereby causing current to flow from condenser 34 through cathode 35 to plate 37, thereby causing the charge of condenser 34 to be altered such that the plate of condenser 34 which is connected to grid 13 becomes less negative. This occurs upon application of the leading edge 44 of pulse 43 to plate 37.

As a result, the cathode 18 of cathode follower 14 moves in a positive direction producing a positive excursion of the output wave form, as shown at 45, in Fig. 4*c*. Condenser 34 then charges slowly negative through resistor 20 until it is desired to terminate the output wave form. To terminate the output wave form, a negative pulse, for example, of the type shown at 46, in Fig. 4*b*, is applied through condenser 42 to the cathode of diode 40, thereby driving plate 39 negative and charging condenser 34 negative with respect to ground. This causes the cathode 18 of cathode follower 14 to move in a negative direction to produce the trailing edge of the output wave form, as shown at 47, in Fig. 4*c*.

Referring now to Fig. 5, there is shown a species of the invention illustrating a regenerative pulse stretcher.

In this figure, there is shown a cathode follower tube 14, cathode load resistor 19, grid load resistor 20, diode cathodes 21 and 24, diode plates 22 and 23, charge storage condenser 11, cathode load resistor 25, condenser 26, all arranged in substantially the same circuit relation as that shown in Fig. 1.

The output of the cathode follower 14 is made a regenerative pulse in the following manner. The cathode 18 of cathode follower 14 is connected through a crystal diode 48 and a filter condenser **48*a***, in series, to ground. For the purpose of illustration herein, crystal diodes will be referred to as having crystal anodes and crystal cathodes, electron current flow being possible from the crystal cathode to the crystal anode, but substantially impossible in the reverse direction. For purposes of illustration in the drawings, crystal anodes will be represented as hollow triangles, and crystal cathodes as solid black lines in contact with an apex of the hollow triangle.

Crystal diode 48 has the crystal anode 49 thereof connected to cathode 18, and a crystal cathode 50 connected to the condenser **48*a*. Crystal cathode 50 is connected through a resistor 51 to a source of negative potential of, for example, minus 100 volts, and to the crystal cathode 52 of a crystal diode 53. Crystal anode 54 of crystal diode 53 is connected to a source of positive potential of, for example, plus 120 volts through a resistor 55, and to the crystal cathode 56 of a crystal diode 57 whose crystal anode 58 is connected to a negative bias source of, for example, minus ten volts. Crystal anode 54 is also connected to the crystal anode 59 of a crystal diode 60 whose crystal cathode 61 is connected to a negative voltage source of, for example, minus 100 volts through a resistor 62. Crystal cathode 61 is also connected through a condenser 63 to a source of regenerative pulses which may be, for example, positive pips occurring at a two hundred kilocycle rate. Crystal anode 54 is also connected to the crystal anode 64 of a crystal diode 65 whose crystal cathode 66 is connected to the grid 67 of an amplifier tube 68. Grid 67 is also connected to a source of negative potential of, for example, minus 100 volts through a grid load resistor 69, and to the crystal cathode 70 of a crystal diode 71 whose crystal anode 72 is connected to a negative bias source of, for example, minus ten volts. Grid 67 is also connected to the crystal cathode 73 of a crystal diode 74 whose crystal anode 75 is connected to a source of positive set input pulses similar to the set input signal source 12, illustrated in Fig. 1. The cathode 76 and suppressor grid 77 of amplifier tube 68 are connected to ground. The screen grid 78 of amplifier tube 68 is connected to a positive potential of, for example, 120 volts, and the plate 79 of tube 68 is connected to a positive potential through a plate load resistor 80. Plate 79 is also connected to the side of charge storage condenser 11 to which set input signal source 12** was connected in Fig. 1.

Referring now to Figs. 6*a*, 6*b*, 6*c* and 6*d*, the operation of the device illustrated in Fig. 5 will be described.

Figures 6A, 6B, 6C, 6D:
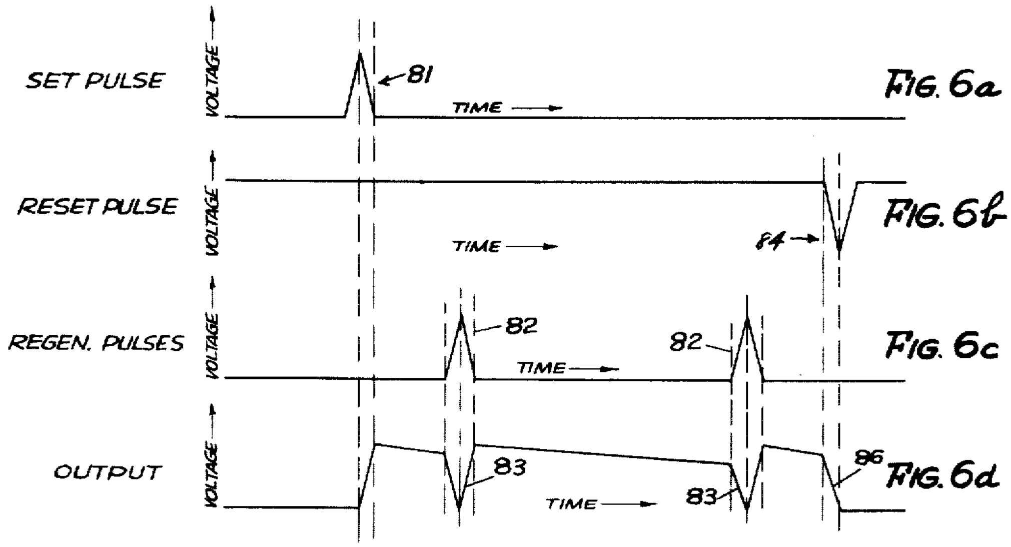

When a positive set pulse of, for example, the type shown at 81, in Fig. 6*a*, is applied to the set input in Fig. 5, crystal anode 75 is driven in a positive direction, drawing current from crystal cathode 73 which thereby applies the pulse to the grid 67 of amplifier tube 68. The increase in current passed through tube 68, due to the raising of the grid 67 positive, produces an increased drop across plate load resistor 80, thereby driving plate 79 negative.

As a result, the charge storage condenser 11 has its charge altered in substantially the same manner as that described in Fig. 1, thereby producing an excursion of cathode follower 14 in a positive direction. The change in potential of cathode 18 in a positive direction is applied to crystal anode 49 of crystal diode 48. The crystal cathode 50 thereof is thereby varied in a positive direction, as a result, altering the charge on condenser 48*a* so that the ungrounded side thereof moves positive.

In this circuit, condenser 48*a* and resistor 51 act as a filter circuit to smooth out sudden changes in the potential of the cathode 18 when cathode 18 is driven in a negative direction, since under these conditions crystal diode 48 cuts off, and condenser 48*a* charges slowly through resistor 51. However, when cathode 18 is driven positive, condenser 48*a* discharges rapidly through crystal diode 48. The result is a unidirectional filter action similar to that found in most rectifier or detector circuits. The wave form thus filtered is applied to the crystal cathode 52 of crystal diode 53 such that, when cathode 18 is moved in a positive direction, crystal cathode 52 is driven in a positive direction.

It may be noted that diodes 53 and 60 are normally conducting, due to electron flow from minus 100 volts through resistors 51 and 62, diodes 53 and 60 and diode 57 to the bias voltage. The value of the resistors 51 and 62 is such that the electron flow through either diode 53 or diode 60 is greater than the electron flow through resistor 55.

When the crystal cathode 52 is moved positive, the flow of electrons through diode 53 is cut off. The crystal cathode 52 of diode 53 remains at the bias potential until a positive regenerative pulse is applied to the crystal cathode 61 of diode 60. The electron flow through diode 60 is then also cut off, and the potential at the crystal 56 of diode 57 rises exponentially toward B+ (plus 120 volts.) This rise in potential is passed through diode 65 to the grid 67 of tube 68. The potential at the crystal cathode 56 of diode 57 only rises to an amplitude approximately equal to the amplitude of the regenerative pulses, at which time diode 60 begins to conduct again. The potential at the crystal cathode 56 of diode 57, therefore, follows approximately the wave form of the regenerative pulses. The regenerative pulses 82 appearing at crystal anode 54 are fed through crystal diode 65 to the grid 67 of tube 68, thereby periodically recharging condenser 11. Since, during the recharging process, the condenser 11 must be driven negative to produce the charge, the output wave form developed at cathode 18 is periodically driven negative, for example, as shown at 83, in the wave form illustrated in Fig. 6*d*. Accordingly, the filter condenser 48*a* necessary to smooth out these periodic negative bumps in order that the gate comprising resistors 62, 51 and 55, and crystal diodes 57 and 60 will not be cut off.

When it is desired to terminate the pulse output from the cathode 18, a negative reset pulse, for example, as shown at 84, in Fig. 6*b*, is fed through condenser 26 to charge condenser 11 negatively in a manner similar to that described, in connection with Fig. 1. The termination of the output wave form, for example, as shown at 86, in Fig. 6*d*, permits the filter condenser 48*a* to discharge through resistor 51, thereby lowering the potential of crystal cathode 52 which draws crystal anode 54 down to substantially the same potential. Under these conditions, the gate is shut off, and regenerative pulses which attempt to pass crystal diode 60 are clipped off by crystal diode 57 which is conducting heavily.

The purpose of crystal diodes 74 and 65 is to prevent cross feed between the regenerative pulses and the set input pulses. The purpose of crystal diode 71 is to maintain the grid 67 at a constant negative bias of, for example, minus ten volts in the absence of circuit activity.

Referring now to Fig. 7, there is shown a circuit diagram of another embodiment of this invention wherein cathode follower 14, charge storage condenser 34, diodes 36 and 40, and the associated condensers and resistors are identical with those shown in Fig. 3.

In order to produce regeneration with this circuit, a gate is provided comprising resistors 62 and 55, crystal diodes 53, 57 and 60, and regeneration pulse input condenser 63, all similar to those shown in Fig. 5. The cathode 18 of cathode follower 14 is connected directly to the crystal cathode 52 of crystal diode 53. An amplifier 87 is provided having a cathode 88 and a suppressor grid 89 connected to ground. The grid 90 of amplifier 87 is connected to a source of negative potential through a grid resistor 91, and to the crystal cathode 92 of a crystal diode 93 whose crystal anode 94 is connected to a negative bias source of, for example, minus eight volts. Grid 90 is also connected to the crystal cathode 95 of a crystal diode 96, the crystal anode 97 of which is connected to the set input signal source. Grid 90 is also connected to the crystal cathode 98 of a crystal diode 99, the crystal anode 100 of which is connected through crystal diode 53 to cathode 18 of cathode follower 14. Screen grid 101 of amplifier 87 is connected to a source of positive potential of, for example, 120 volts, and the plate 102 of amplifier 87 is connected through the primary winding 103 of a pulse transformer 104 to a source of positive potential of, for example, 120 volts. A secondary winding 105 of pulse transformer 104 has one end thereof connected to the plate 37 of diode 36, and the other end thereof connected to a negative bias source of, for example, minus twenty-four volts. A crystal diode 106 is connected across secondary winding 105 with the crystal cathode 107 thereof connected to plate 37, and the crystal anode 108 thereof connected to the bias source.

Referring now to Figs. 8*a*, 8*b*, 8*c* and 8*d*, the operation of this device will be described.

Figures 8A, 8B, 8C, 8D:
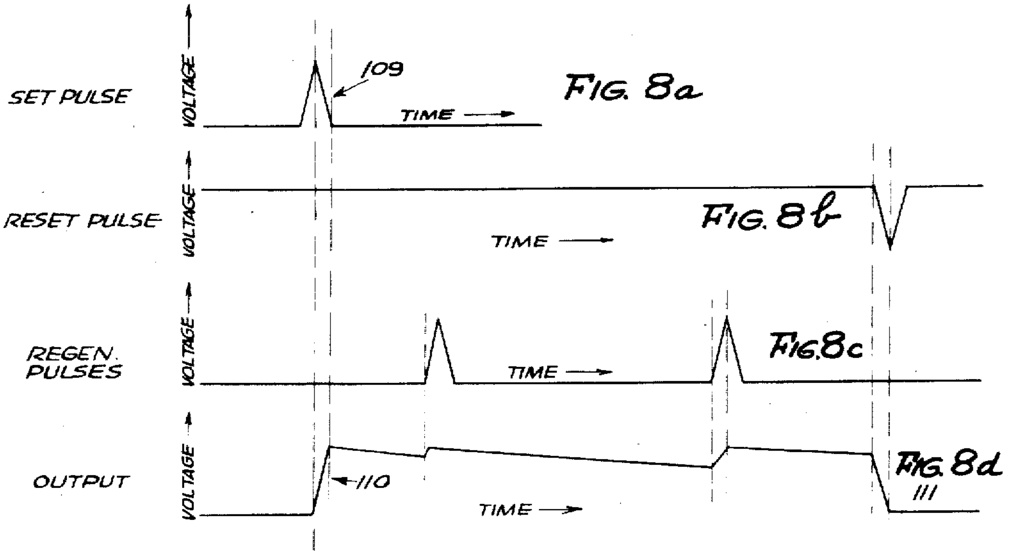

When it is desired to initiate a pulse, a positive pip, for example, of the type, as shown in Fig. 8*a* at 109, is fed through crystal diode 96 to the grid 90 of amplifier 87 driving it in a positive direction. The increase in current through amplifier 87 produces a current pulse through transformer primary winding 103, thereby inducing a voltage pulse across secondary winding 105. Windings 103 and 105 are so connected that the end of winding 105 which is connected to plate 37 will be driven positive by the application of a positive pulse to grid 90. Application of the positive pulse to plate 37 produces a change in charge on condenser 34 which drives the grid 13 of cathode follower 14 in a positive direction in the same manner as described in connection with Fig. 3.

When the cathode 18 moves positive to form the beginning of the output wave form, as shown at 110, in Fig. 8*d*, crystal diode 53 is cut off, and permits positive regenerative pulse pips to feed through condenser 63, crystal diode 60, and crystal diode 99 to the grid 90 in a manner similar to that previously described in connection with Fig. 5, thereby periodically renewing the charge on condenser 34.

When it is desired to terminate the output wave form, a negative reset pulse is applied through condenser 42 to the cathode of diode 40, thereby charging condenser 34 more negative and driving grid 13 of cathode follower 14 negative to produce the trailing edge of the output wave form, as shown at 111 in Fig. 8*d*. This causes crystal diode 57 to again become conductive, thereby closing the gate and preventing regenerative pulses from feeding through crystal diode 60.

Referring now to Fig. 9, there is shown a still further embodiment of this invention wherein a charge storage condenser 115 has one side thereof connected to set input signal source of the type shown in Fig. 1, and the other side connected to the grid 116 of a cathode follower amplifier 117. The screen grid 118 and plate 119 of cathode follower 117 are connected to a source of positive potential of, for example, 120 volts. The cathode 120 of cathode follower 117 is connected through resistor 121 and resistor 122, in series, to a source of negative potential of, for example, minus 100 volts. Cathode 120 is also connected to the crystal cathode 52 of crystal diode 53. Crystal diodes 53, 57 and 60, resistor 62 and regenerative pulse input condenser 63 are connected, in circuit, with resistor 55 in substantially the same manner as that shown in Fig. 7, said components comprising a gate whose operation is similar to that described in connection with Fig. 7. Crystal anode 54 of crystal diode 53 is connected through a condenser 126 to the crystal cathode 127 of a crystal diode 128, the crystal anode 129 of which is connected to the junction between resistors 121 and 122. Crystal anode 54 is also connected through a condenser 130 to the crystal cathode 131 of a crystal diode 132, the crystal anode 133 of which is connected through a condenser **134*a* to the cathode 120 of the cathode follower 117. Crystal anode 133 is also connected to the crystal cathode 134 of a crystal diode 135, the crystal anode 136 of which is connected to crystal cathode 127. Crystal cathode 131 is also connected to the crystal cathode 136*a* of a crystal diode 137, crystal anode 138 of which is connected to a negative bias source of, for example, minus twenty-four volts. Crystal cathode 136*a* is also connected to the crystal anode 139 of a crystal diode 140, the crystal cathode 141 of which is connected to the grid 116 of cathode follower 117. Grid 116 is also connected to the crystal anode 142 of a crystal diode 143, the crystal cathode 144 of which is connected to ground through a resistor 145 and to a reset input signal pulse source through a coupling condenser 146**.

Referring now to Figs. 10*a*, 10*b*, 10*c* and 10*d*, the operation of the device shown in Fig. 9 will be described.

When it is desired to initiate an output wave form from the cathode 120 of cathode follower 117, a negative set input pulse is applied to condenser 115 from the set input signal source. The negative pulse which may be. for example, of the type shown at 147 in Fig. 10*a*, drives the crystal diode 140 negative, causing a current to flow from the negative bias source through crystal diode 137, crystal diode 140 to alter the charge on condenser 115. When the set input pulse is removed, condenser 115 is raised in voltage, thereby cutting off crystal diodes 137 and 140, and raising the potential of grid 116 by substantially the amplitude of the set input pulse. Cathode 120 follows grid 116 to create the excursion of the output wave form in a positive direction, as shown at 148, in Fig. 10*d*. This raising of the cathode 120 in a positive direction cuts off crystal diode 53, thereby opening the gate. Regenerative pulses are then fed through condenser 63 and the gate to condensers 126 and 130, which, together with crystal diodes 132, 135 and 128 and condenser **134*a***, comprise a voltage doubler circuit.

Figures 10A, 10B, 10C, 10D:
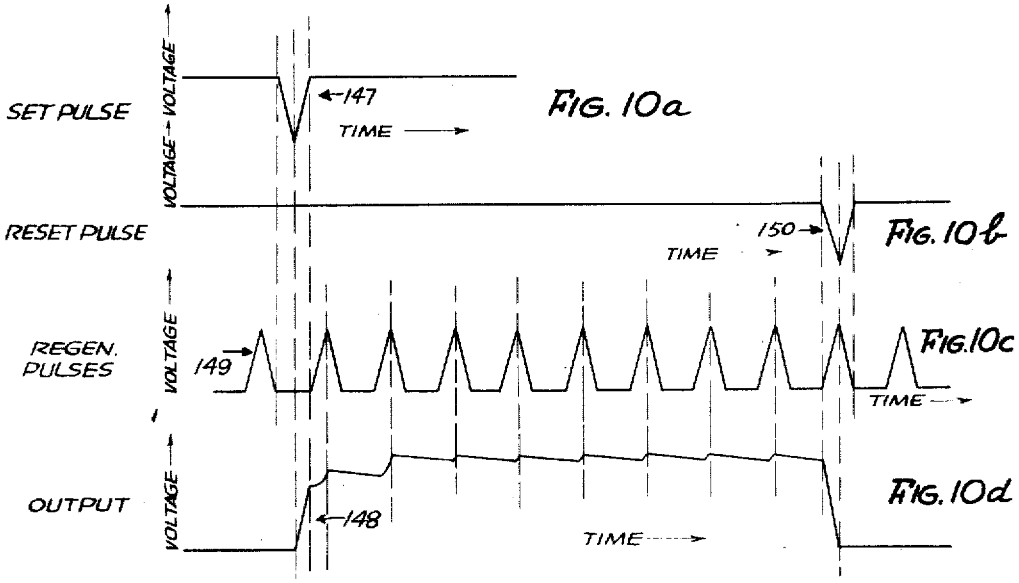

The voltage doubler circuit operates in the following manner. When the regenerative pulses which may be, for example, of the type shown at 149 in Fig. 10*c*, are fed through condenser 126, they cause crystal diode 135 to conduct, thereby causing the plate of condenser **134*a*, which is connected to crystal diode 135, to be charged in a positive direction. During this period, the pulse is also applied to condenser 130, and, as a result, crystal diode 132 remains substantially nonconductive, since substantially the same potential is applied to each side thereof. However, at the termintion of each regenerative pulse, the side of condenser 130 which is connected to the gate is lowered, and the other side thereof is charged from condenser 134*a* through crystal diode 132. Thus, when the succeeding regenerative pulses are applied to condenser 130, the peaks are substantially twice as high on the opposite side of condenser 130 as they would have been without the charge storage action of the condenser 134*a*. The positive peaks are applied to crystal anode 133, thereby drawing current from the crystal cathode 141 thereof, and driving the grid 116 of cathode follower 117 positive. The current drawn through crystal diode 140 by these pulse peaks charges the side of condenser 115 which is connected to grid 116 positive, thereby replenishing the charge on condenser 115 which has leaked off since application of the set pulse 147**.

When it is desired to terminate the output wave form, a negative pulse, for example, of the type shown at 150, in Fig. 10*b*, is applied through condenser 146 to crystal cathode 144 rendering crystal diode 143 conductive, and charging the side of condenser 115 which is connected to grid 116 negative, thereby lowering the potential of cathode 120, and cutting off the gate comprising crystal diodes 57 and 60 by rendering crystal diode 57 conductive.

This completes the description of the specific embodiments of the invention illustrated herein. However, many modifications thereof will be apparent to persons skilled in the art without departing from the spirit and scope of this invention. For example, thermionic diodes could be used in place of any of the crystals shown, and the particular type of gate shown is by way of example only, and any desired type of gate may be used.

Furthermore, the shape of the set, reset, and regenerative pulses is by way of example only, and said pulses could be, if desired, sinusoidal or rectangular, or, indeed, any other desired shape. Accordingly, it is desired that this invention be not limited to the particular details as described herein, except as defined by the appended claims.

What is claimed is:

1. A variable width pulse stretcher comprising signal storage means having first and second terminals at opposite poles thereof, signal output means fed by way of the second terminal of said signal storage means, means operative by way of the first terminal of said signal storage means for storing signals a predetermined time in said signal storage means, signal controllable means for entirely removing said signals from said storage means, comprising a reset circuit having an input condenser connected in series with an input reset terminal and a diode having an anode connected to one terminal of said signal storage means and a cathode connected to the opposite terminal of said input condenser, and a source of signals independent of signals stored by said pulse stretcher connected to said input reset terminal for controlling said last-named means.

2. A variable width pulse stretcher comprising a signal storage condenser having first and second terminals at opposite sides thereof, signal output means fed by way of the second terminal of said condenser, means operative by way of the first terminal of said condenser for storing signals for predetermined lengths of time in said condenser, signal controllable means for removing said signals from said condenser, comprising a reset circuit having an input condenser connected in series with an input reset terminal and a diode having an anode connected to one terminal of said signal storage means and a cathode connected to the opposite terminal of said connected to one terminal of said signal storage means and dependent of signals stored by said pulse stretcher connected to said input reset terminal for controlling said last-named means.

3. A pulse stretcher comprising signal storage means having first and second terminals at opposite poles thereof, signal output means fed by way of the second terminal of said signal storage means, means operative by way of the first terminal of said signal storage means for storing signals for predetermined lengths of time in said signal storage means, and means responsive to said output means for replacing signals in said storage means.

4. A pulse stretcher comprising signal storage means having first and second terminals at opposite connections thereto, signal output means fed by way of the second terminals of said signal storage means, means operative by way of the first terminal of said signal storage means for storing signals for predetermined lengths of time in said signal storage means, means responsive to said output means for replacing signals in said storage means, and means for removing after varying intervals of time said signals from said storage means.

5. A pulse stretcher comprising a signal storage condenser having first and second terminals at opposite sides thereof, signal output means fed by way of the second terminal of said condenser, means operative by way of the first terminal of said condenser for storing signals a predetermined time in said condenser, and means responsive to said output means for periodically replacing signals in said condenser.

6. A pulse stretcher comprising a signal storage condenser having first and second terminals at opposite sides thereof, signal output means fed by way of the second terminal of said condenser, means operative by way of the first terminal of said condenser for storing signals in said condenser, means responsive to said output means for replacing signals in said condenser, and means for removing said signals at varying time intervals from said condenser.

7. A variable width pulse stretcher comprising in combination with an electronic amplifier, and a signal source, a signal storage means having first and second terminals at opposite poles thereof, signal output means including said electronic amplifier continuously fed by way of the second terminal of said signal storage means, means operative by way of the first terminal of said signal storage means for storing signals a predetermined time in said signal storage means, signal controllable means for entirely removing said signals from said storage means comprising a reset circuit having an input condenser connected in series with an input reset terminal and a diode having an anode connected to one terminal of said signal storage means and a cathode connected to the opposite terminal of said input condenser, and a source of signals independent of signals stored by said pulse stretcher connected to said input reset terminal for controlling said last-named means.

8. A variable width pulse stretcher comprising a signal storage means having first and second terminals at opposite poles thereof, signal output means including a cathode follower continuously fed by way of the second terminal of said signal storage means, means operative by way of the first terminal of said signal storage means for storing signals a predetermined time in said signal storage means, signal controllable means for entirely removing said signals from said storage means comprising a reset circuit having an input condenser connected in series with an input reset terminal and a diode having an anode connected to one terminal of said signal storage means and a cathode connected to the opposite terminal of said input condenser, and a source of signals independent of signals stored by said pulse stretcher connected to said input reset terminal for controlling said last-named means.

9. A pulse stretcher comprising a signal storage condenser, signal output means continuously fed by said condenser, a signal gate responsive to said output means, and a source of signals connected in circuit with said condenser through said gate.

10. A pulse stretcher comprising a signal storage condenser, a cathode follower fed by said condenser, a signal gate responsive to the output of said cathode follower, and a source of signals connected in circuit with said condenser through said gate.

11. A variable width pulse stretcher comprising in combination with an electronic amplifier and a signal source, signal storage means having first and second terminals at opposite poles thereof, signal output means including a cathode follower fed by way of the second terminal of said signal storage means, means including said electronic amplifier operative by way of the first terminal of said signal storage means for storing signals a predetermined time in said signal storage means, a signal gate responsive to the output of said cathode follower, a source of signals connected in circuit with said amplifier through said gate, signal controllable means for entirely removing said signals from said storage means comprising a reset circuit having an input condenser connected in series with an input reset terminal and a diode having an anode connected to one terminal of said signal storage means and a cathode connected to the opposite terminal of said input condenser, and a source of signals independent of signals stored by said pulse stretcher connected to said input reset terminal for controlling said last-named means.

12. A variable width pulse stretcher comprising signal storage means having first and second terminals at opposite poles thereof, signal output means including a cathode follower fed by way of the second terminal of said signal storage means, a signal gate responsive to the output of said cathode follower, said signal source comprising an amplifier connected to the first terminal of said storage means, a first source of signals connected to said signal storage means through said amplifier, a source of signals connected in circuit with said amplifier through said gate, signal controllable means for entirely removing said signals from said signal storage means comprising a reset circuit having an input condenser connected in series with an input reset terminal and a diode having an anode connected to one terminal of said signal storage means and a cathode connected to the opposite terminal of said input condenser, and a source of signals independent of signals stored by said pulse stretcher connected to said input reset terminal for controlling said last-named means.

13. A variable width pulse stretcher comprising in combination with an amplifier, a signal storage means having first and second terminals at opposite poles thereof, signal output means including said electronic amplifier fed by way of the second terminal of said signal storage means, means including a unidirectional conductor operative by way of the first terminal of said signal storage means for storing signals a predetermined time in said signal storage means, signal controllable means for entirely removing said signals from said signal storage means comprising a reset circuit having an input condenser connected in series with an input reset terminal and a diode having an anode connected to the input of said amplifier and a cathode connected to the opposite terminal of said input condenser, and a source of signals independent of signals stored by said pulse stretcher connected to said input reset terminal for controlling said last-named means.

14. A pulse stretcher comprising in combination with an amplifier, a condenser in series with a first substantially unidirectional conductor and said amplifier, a first source of signals connected in circuit with the input of said amplifier, and a second source of signals connected to the input of said amplifier through a voltage doubler, and reset means including an input condenser connected in series with an input reset terminal and a diode having an anode connected to the input of said amplifier and a cathode connected to the opposite terminal of said input condenser, and a source of signals independent of signals stored by said pulse stretcher connected to said input reset terminal for controlling said last-named means.

15. A pulse stretcher comprising in combination with an amplifier, a condenser in series with a first substantially unidirectional conductor and said amplifier, a first source of signals connected in circuit with the input of said amplifier, and a second source of signals connected to the input of said amplifier through a voltage doubler and a gate, and reset means including an input condenser connected in series with an input reset terminal and a diode having an anode connected to the input of said amplifier and a cathode connected to the opposite terminal of said input condenser, and a source of signals independent of signals stored by said pulse stretcher connected to said input reset terminal for controlling said last-named means.

16. A pulse stretcher comprising a condenser in series with a first substantialy unidirectional conductor and a signal supply, said condenser feeding an amplifier, a first source of signals connected in circuit with the input of said amplifier, and a second source of signals connected to the input of said amplifier through a voltage doubler and a gate, said gate being responsive to the charge on said condenser.

17. A pulse stretcher comprising a condenser in series with a first substantially unidirectional conductor and a signal source, a cathode follower fed by said condenser, a signal gate responsive to the output of said cathode follower, a first source of signals connected in circuit with the input of said cathode follower, and a second source of signals connected to the input of said cathode follower through a voltage doubler and said gate.

18. Means for controlling the operation of a wave form generator comprising, in combination with said generator, a signal source, energy storage means directly fed by said signal source and interposed in series between said signal source and said generator, diode rectifying means connected in series with a fixed source of bias and said signal source, and generator output controlled means cooperating with said signal source for regulating the storage of energy in said storage means.

19. In combination with a wave form generator, a source of excitation energy for said generator, energy storage means connected directly to and serially between said excitation source and said generator, diode rectifying means connected in series with a fixed source of bias and said source of excitation energy and means interposed between said storage means and said generator for regulating the storage of energy in said storage means.

References Cited in the file of this patent

UNITED STATES PATENTS

| | | |
|---|---|---|
| 2,222,759 | Burnside | Nov. 26, 1940 |
| 2,299,945 | Wendt | Oct. 27, 1942 |
| 2,358,448 | Earp | Sept. 19, 1944 |
| 2,419,340 | Easton | Apr. 22, 1947 |
| 2,487,191 | Smith | Nov. 8, 1949 |
| 2,572,080 | Wallace | Oct. 23, 1951 |
| 2,573,150 | Lacy | Oct. 30, 1951 |
| 2,640,965 | Eaglesfield | June 2, 1953 |

UNITED STATES PATENT OFFICE

CERTIFICATE OF CORRECTION

Patent No. 2,802,101

August 6, 1957

Charles F. West et al.

It is hereby certified that error appears in the printed specification of the above numbered patent requiring correction and that the said Letters Patent should read as corrected below.

Column 2, line 11, for "object" read -- objects --; line 28, strike out "and", second occurrence; column 3, line 36, for "thereby producing a positive excursion" read -- tion to produce the trailing edge --; column 5, line 43, after "crystal" insert -- cathode --; column 8, line 63, after "condenser" strike out the comma; line 68, strike out "to one terminal of said signal storage means and" and insert instead -- input condenser, and a source of signals --; line 69, for "dependent" read -- independent --; column 9, line 8, for "terminals" read -- terminal --; column 10, line 4, after "amplifier" insert a comma; line 30, after "said" insert -- signal --.

Signed and sealed this 15th day of October 1957.

(SEAL)

Attest:

KARL H. AXLINE

Attesting Officer

ROBERT C. WATSON

Commissioner of Patents